(12) United States Patent
Becerra et al.

(10) Patent No.: US 8,175,899 B2
(45) Date of Patent: May 8, 2012

(54) SYSTEMS AND METHODS FOR PROCESSING A REQUEST TO REPAIR OR REPLACE AN ITEM COVERED BY INSURANCE

(75) Inventors: Manuel Becerra, Miami, FL (US); James Hickey, Coral Gables, FL (US); Doris Vigo, Coral Gables, FL (US)

(73) Assignee: Fortis, Inc., New York, NY (US)

( * ) Notice: Subject to any disclaimer, the term of this patent is extended or adjusted under 35 U.S.C. 154(b) by 530 days.

(21) Appl. No.: 12/269,299

(22) Filed: Nov. 12, 2008

(65) Prior Publication Data

US 2009/0063202 A1 Mar. 5, 2009

Related U.S. Application Data

(62) Division of application No. 10/664,483, filed on Sep. 19, 2003, now abandoned.

(60) Provisional application No. 60/411,997, filed on Sep. 20, 2002.

(51) Int. Cl.
*G06Q 40/00* (2012.01)

(52) U.S. Cl. ............................................. 705/4; 707/600

(58) Field of Classification Search ........ 705/4; 701/35; 1/1

See application file for complete search history.

(56) References Cited

U.S. PATENT DOCUMENTS

| | | | |
|---|---|---|---|
| 5,208,853 A | 5/1993 | Armbruster et al. | |
| 5,950,169 A * | 9/1999 | Borghesi et al. | 705/4 |
| 6,170,742 B1 | 1/2001 | Yacoob | |
| 6,208,853 B1 | 3/2001 | LoVasco et al. | |
| 6,519,470 B1 | 2/2003 | Rydbeck | |
| 6,574,606 B1 | 6/2003 | Bell et al. | |
| 2001/0042022 A1 | 11/2001 | Kirkpatrick et al. | |
| 2001/0051884 A1 | 12/2001 | Wallis et al. | |
| 2002/0010599 A1 * | 1/2002 | Levison | 705/4 |
| 2002/0010613 A1 | 1/2002 | Lallo | |
| 2002/0016655 A1 * | 2/2002 | Joao | 701/35 |
| 2002/0032586 A1 * | 3/2002 | Joao | 705/4 |
| 2002/0038281 A1 | 3/2002 | Lohmann et al. | |
| 2002/0065825 A1 | 5/2002 | Kassan et al. | |
| 2002/0115423 A1 | 8/2002 | Hatae et al. | |
| 2002/0116281 A1 | 8/2002 | Costello et al. | |
| 2002/0128857 A1 | 9/2002 | Lee | |
| 2002/0165726 A1 | 11/2002 | Gundrest | |
| 2002/0165741 A1 * | 11/2002 | Becker et al. | 705/4 |
| 2003/0014295 A1 | 1/2003 | Brookes et al. | |
| 2003/0026404 A1 | 2/2003 | Joyce et al. | |
| 2003/0061104 A1 | 3/2003 | Thomson et al. | |
| 2004/0019609 A1 * | 1/2004 | Orton et al. | 707/104.1 |
| 2004/0122697 A1 | 6/2004 | Becerra et al. | |

OTHER PUBLICATIONS

Google search results.*
Dialog search results.*

* cited by examiner

*Primary Examiner* — Dilek B Cobanoglu
(74) *Attorney, Agent, or Firm* — Alston & Bird LLP

(57) ABSTRACT

A method of providing insurance to a customer that comprises the steps of: (1) selling a service contract to the customer that provides protection against the mechanical breakdown or other failure of an item (and in some cases, accidental damage); and (2) in response to the customer purchasing the service contract, providing, at no cost to the customer, third-party-paid insurance coverage that protects the customer against damage to the item, which, in some cases, includes accidental damage. In one embodiment of the invention, the step of providing the third-party-paid insurance coverage is done in order to permit the provision of insurance without the use of a licensed insurance agent.

12 Claims, 8 Drawing Sheets

SYSTEMS AND METHODS FOR PROCESSING A REQUEST TO REPAIR OR REPLACE AN ITEM COVERED BY INSURANCE

CROSS-REFERENCE TO RELATED APPLICATIONS

This is a divisional of U.S. application Ser. No. 10/664,483, filed Sep. 19, 2003 now abandoned, entitled "Systems and Methods for Providing Insurance and Non-Insurance Products," which is hereby incorporated in its entirety by reference and which claims priority from U.S. provisional application Ser. No. 60/411,997, filed Sep. 20, 2002, entitled "Wireless Protection Plan," which is hereby incorporated in its entirety by reference.

BACKGROUND OF THE INVENTION

Most states have laws in place specifying that only a licensed insurance agent may sell property and casualty insurance. As a result, retailers, manufacturers or service providers that wish to provide property and/or casualty insurance to a customer at an item's point of sale must arrange for an insurance agent or the insurer to sell the insurance directly to the customer. This can be expensive and, often, infeasible for the retailer.

In addition, consumers often purchase a contract of property and/or casualty insurance that covers damage to, or the loss (including theft) of, all or part of an item such as a personal electronic device (e.g., a cellular phone, PDA, or two-way pager), even when the item is covered by a service contract that covers item failures, such as the mechanical breakdown of the item. As a result, customers often have two or more different contracts for a single item. This requires customers to keep track of two or more separate contracts, and can make it administratively difficult and confusing for customers to arrange for the repair or replacement of, or indemnity for, a failed, damaged, or lost item. In light of the above, there is a need for improved systems and methods for providing property insurance (and/or other insurance products) to a customer, especially at an item's point of sale.

SUMMARY OF THE INVENTION

A method of providing insurance to a customer according to one embodiment of the invention comprises the steps of: (1) selling a Service Contract to the customer that provides protection against the mechanical breakdown or other failure of an item or its parts; and (2) in response to the customer purchasing the Service Contract, providing, at no cost to the customer, third-party-paid insurance coverage that protects the customer against accidental damage to, and/or loss (including theft) of, the item or a component part. In a particular embodiment of the invention, the step of providing the third-party-paid insurance coverage is done in order to permit the provision of insurance without the sale of the insurance by an insurance agent. The third-party-paid insurance coverage may be paid for, for example, by a retailer selling the item to the customer, a manufacturer of the item, or a service provider (including a wireless service provider) that provides service or functionality for the item. In one embodiment of the invention, the service contract and the third-party-paid insurance coverage are referred to by a single identification indicia, such as a plan number.

A method, according to another embodiment of the invention, of processing a request that an item be repaired or replaced comprises the steps of: (1) receiving the request at a central claim processing facility; (2) determining (e.g., by a central claim processing facility representative) whether the item requires replacement or repair due to a device failure or damage under the terms of a service contract, or a loss under an insurance contract (e.g., damage or theft); (3) in response to determining that the item requires replacement or repair due to a device failure or damage under the terms of the service contract, submitting (e.g., by a central claim processing facility representative) a request to a first provider to process the item according to a service contract that is provided by the first provider; and (4) in response to determining that the item requires replacement, repair or indemnity under the insurance policy (e.g., due to other loss, including theft), submitting a request to a second provider to process the item according to an insurance provision that is provided by the second provider. In a particular embodiment of the invention, one or more of the above steps is executed at the central claim processing facility.

A product protection program according to another embodiment of the invention comprising a service contract that is paid for by a first entity, and insurance coverage that is paid for by a second entity. In a particular embodiment of the invention, the service contract and insurance policy are referenced by a single identification indicia, such as a plan number. Also, in one embodiment of the invention, the first entity is a customer who has purchased an item that is covered under the product protection program, and the second entity is, for example, a retailer that has sold the item to the customer or a wireless carrier that is to provide wireless service for the item.

In a particular embodiment of the invention, the product protection program provides that: (1) in response to the second customer failing to submit timely payment for the insurance coverage, the insurance coverage will be interrupted; and (2) the service contract will not be interrupted in response to the second customer failing to submit timely payment for the insurance coverage. Furthermore, in one embodiment of the invention, the product protection program provides that: (1) in response to the first customer failing to submit timely payment for the service contract, the service contract will be interrupted; and (2) the insurance coverage will be interrupted in response to the first customer failing to submit timely payment for the service contract.

A method, according to yet another embodiment of the invention, of processing a request that an item be repaired or replaced comprises the steps of: (1) receiving the request at a central claim processing facility; (2) determining whether the item requires replacement or repair due to a device failure, accidental damage, theft, or other loss; (3) in response to determining that the item requires replacement or repair due to a device failure (e.g., accidental damage under the terms of some service contracts), submitting a request to a first provider to process the item according to the service contract (which may be referred to as "first provider coverage" that is provided by the first provider; and (4) in response to determining that the item requires replacement or repair due to loss under the insurance policy (which may be accidental damage, theft or other loss), submitting a request to a second provider to process the item according to insurance coverage (which may be referred to as "second provider coverage") that is provided by the second provider.

BRIEF DESCRIPTION OF THE DRAWINGS

Figure 1:
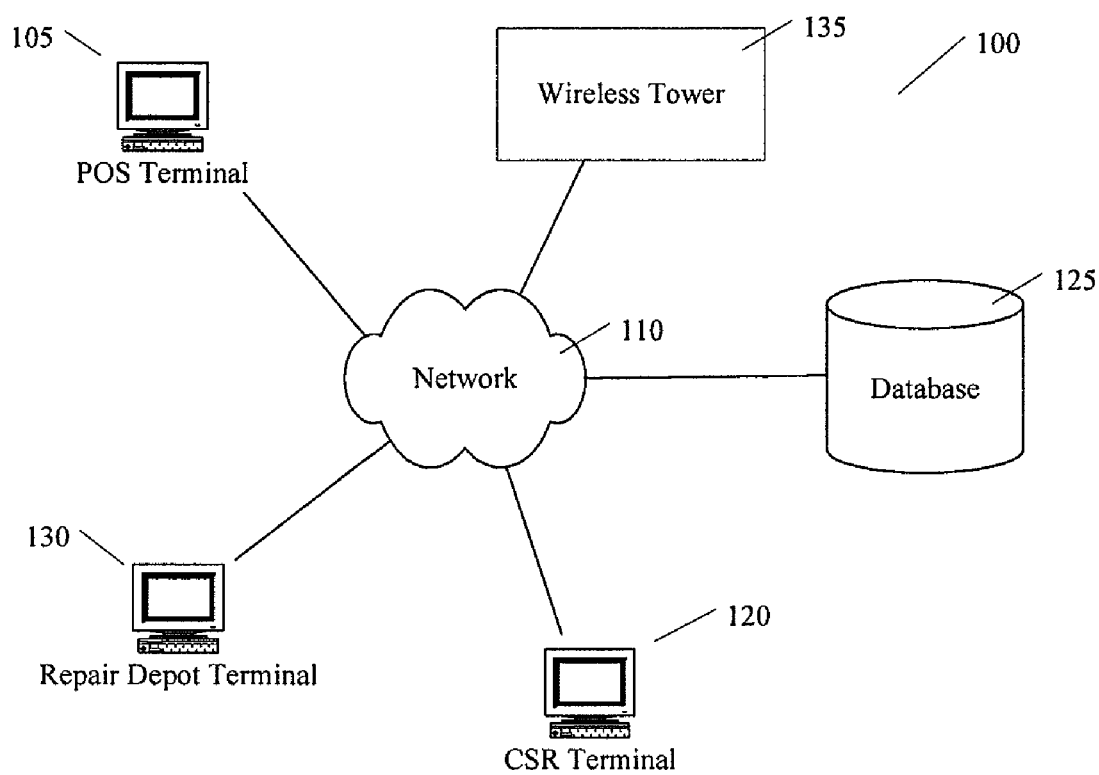

Having thus described the invention in general terms, reference will now be made to the accompanying drawings, which are not necessarily drawn to scale, and wherein:

FIG. 1 is a block diagram of a system according to one embodiment of the invention.

Figure 2:
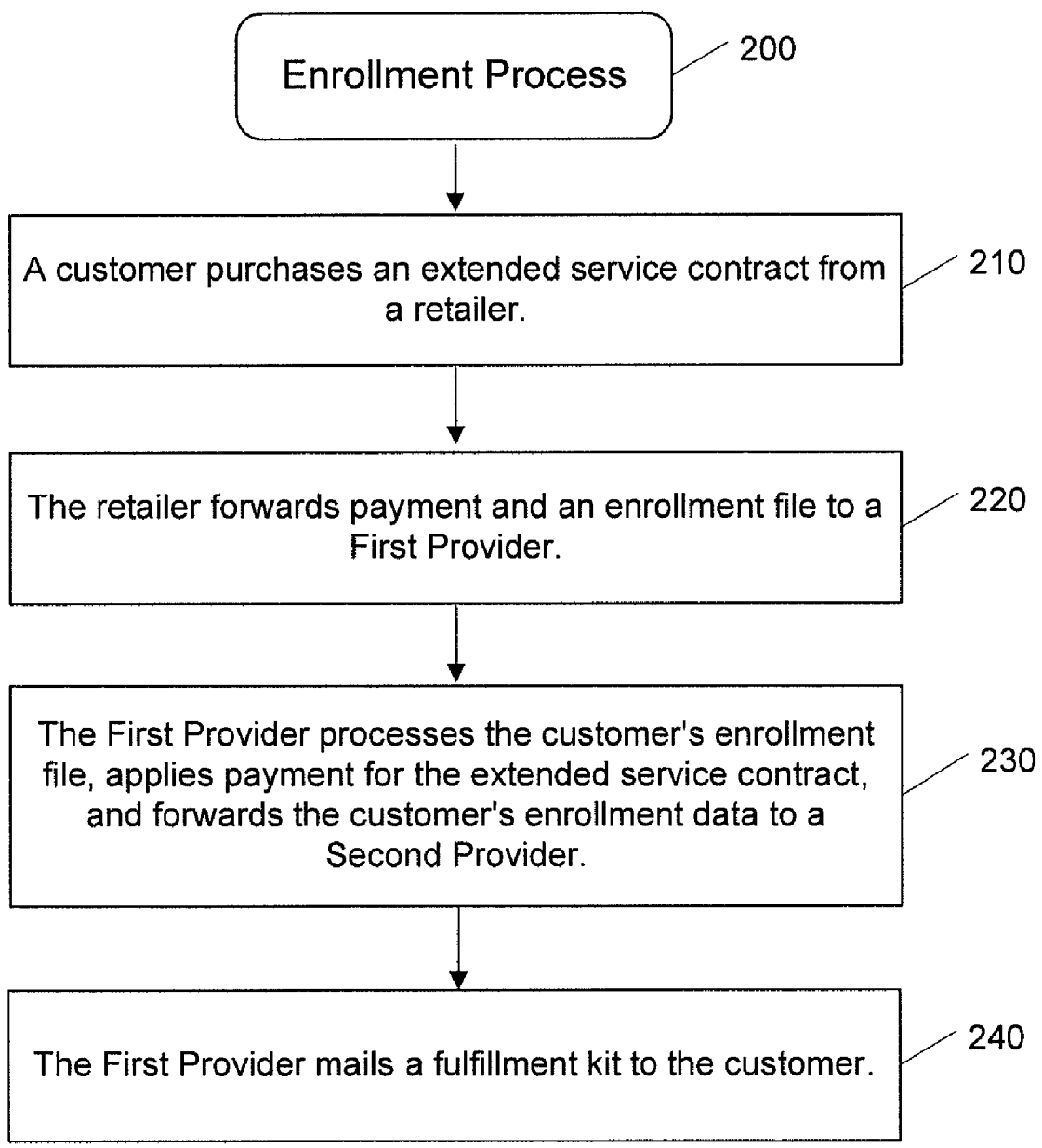

FIG. 2 is a flow chart of an enrollment process according to a particular embodiment of the invention.

Figure 3A:
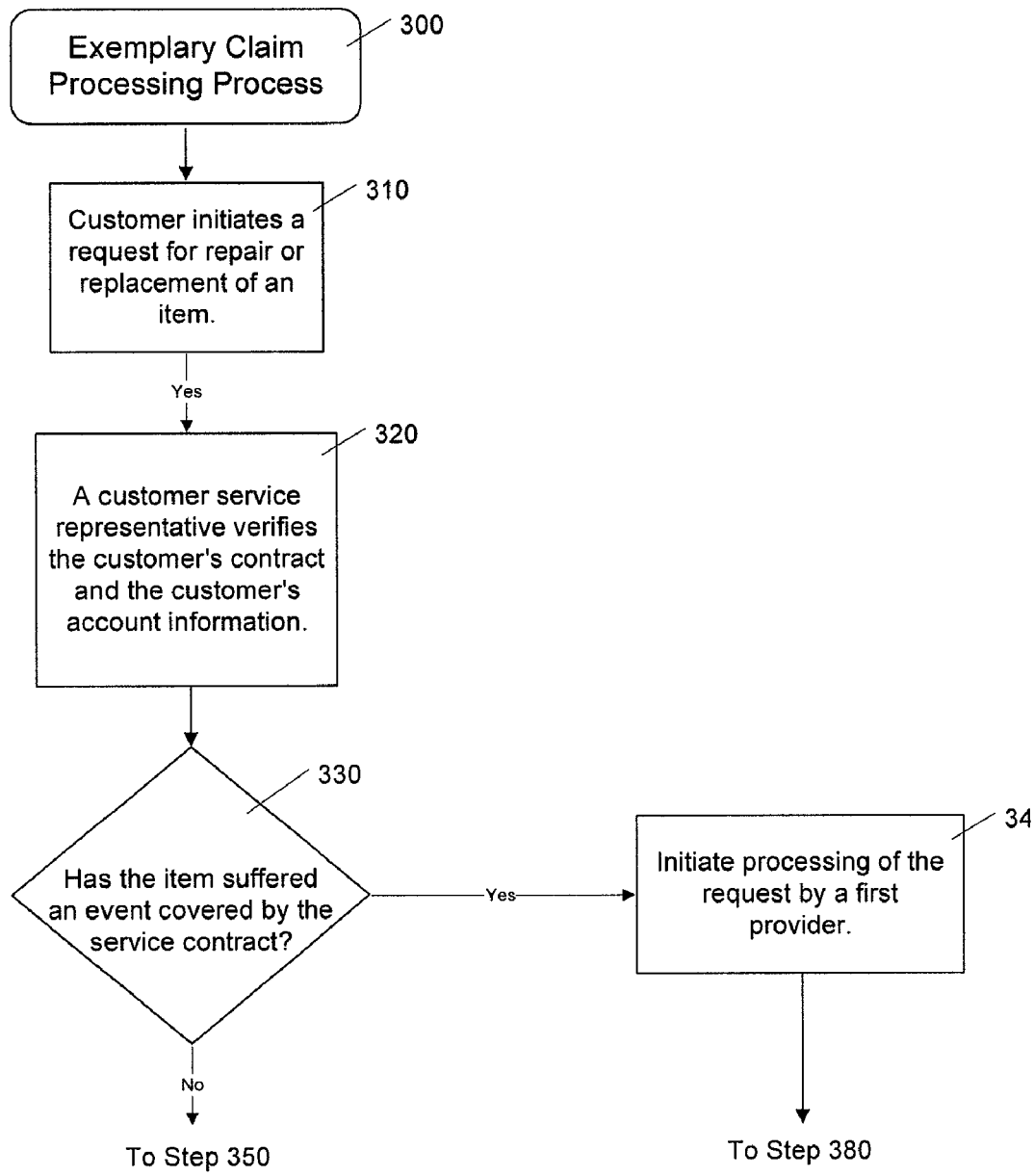
Figure 3B:
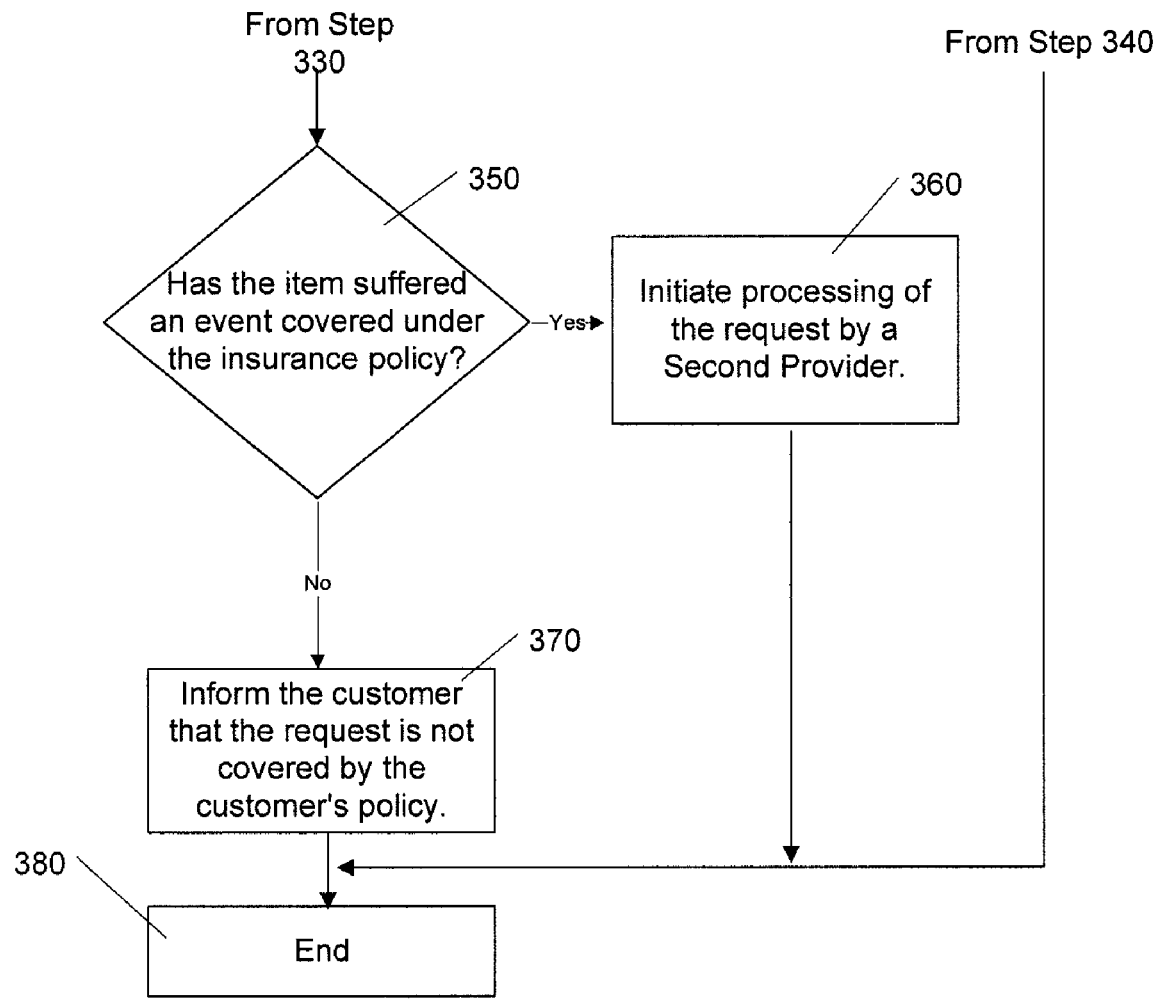

FIGS. 3A and 3B depict a flow chart of an exemplary claim filing process according to a further embodiment of the invention.

Figure 4A:
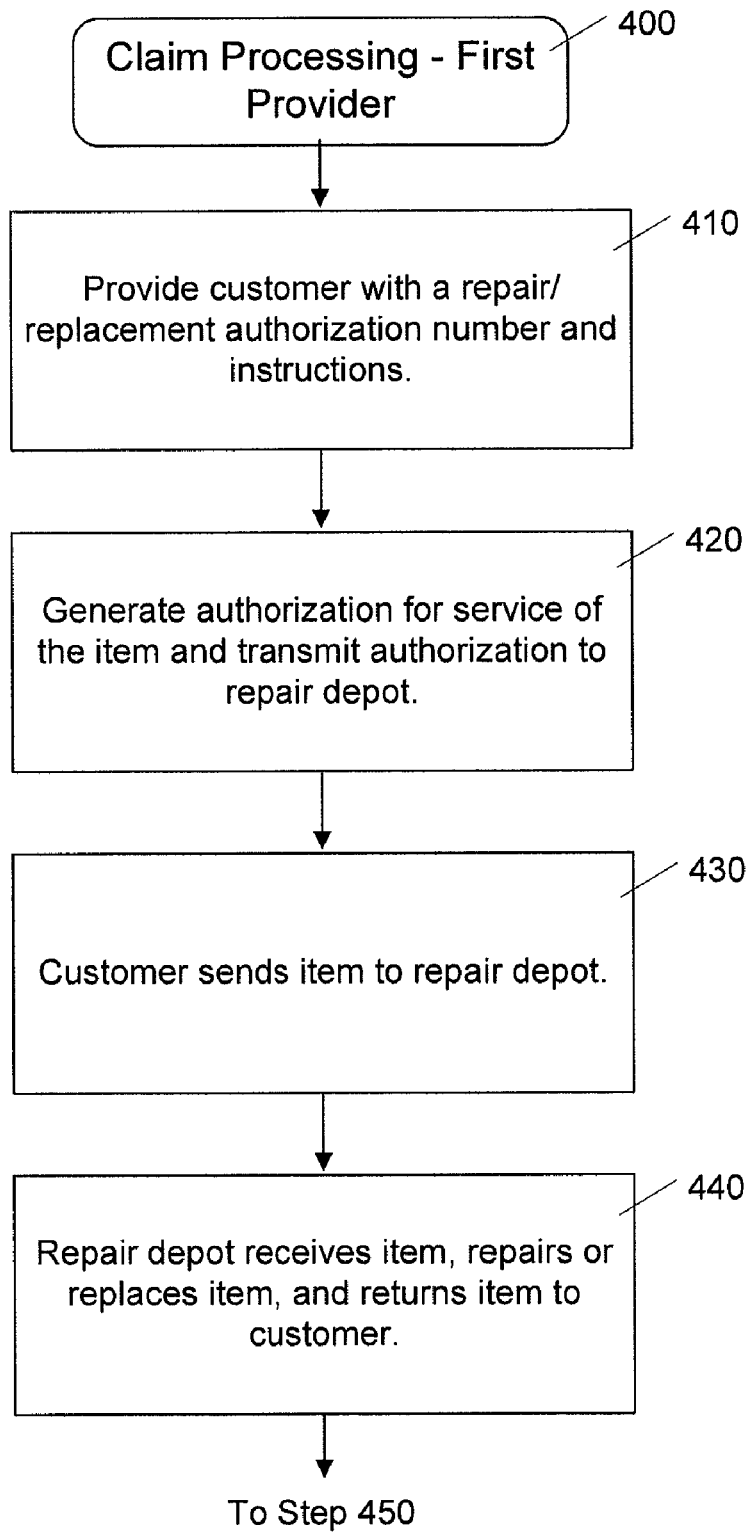
Figure 4B:
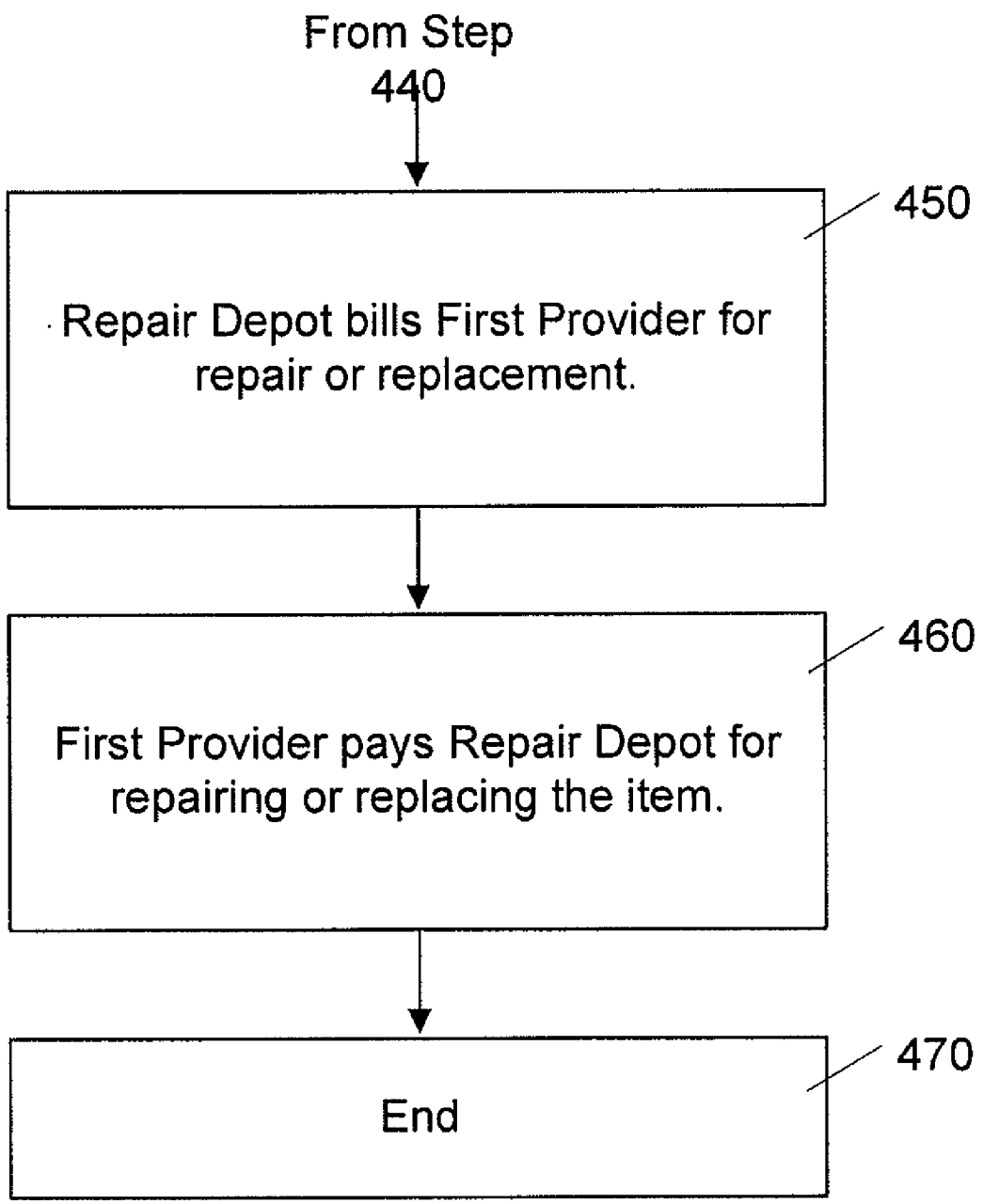

FIGS. 4A and 4B depict a flow chart of a first claim processing method according to yet another embodiment of the invention.

Figure 5A:
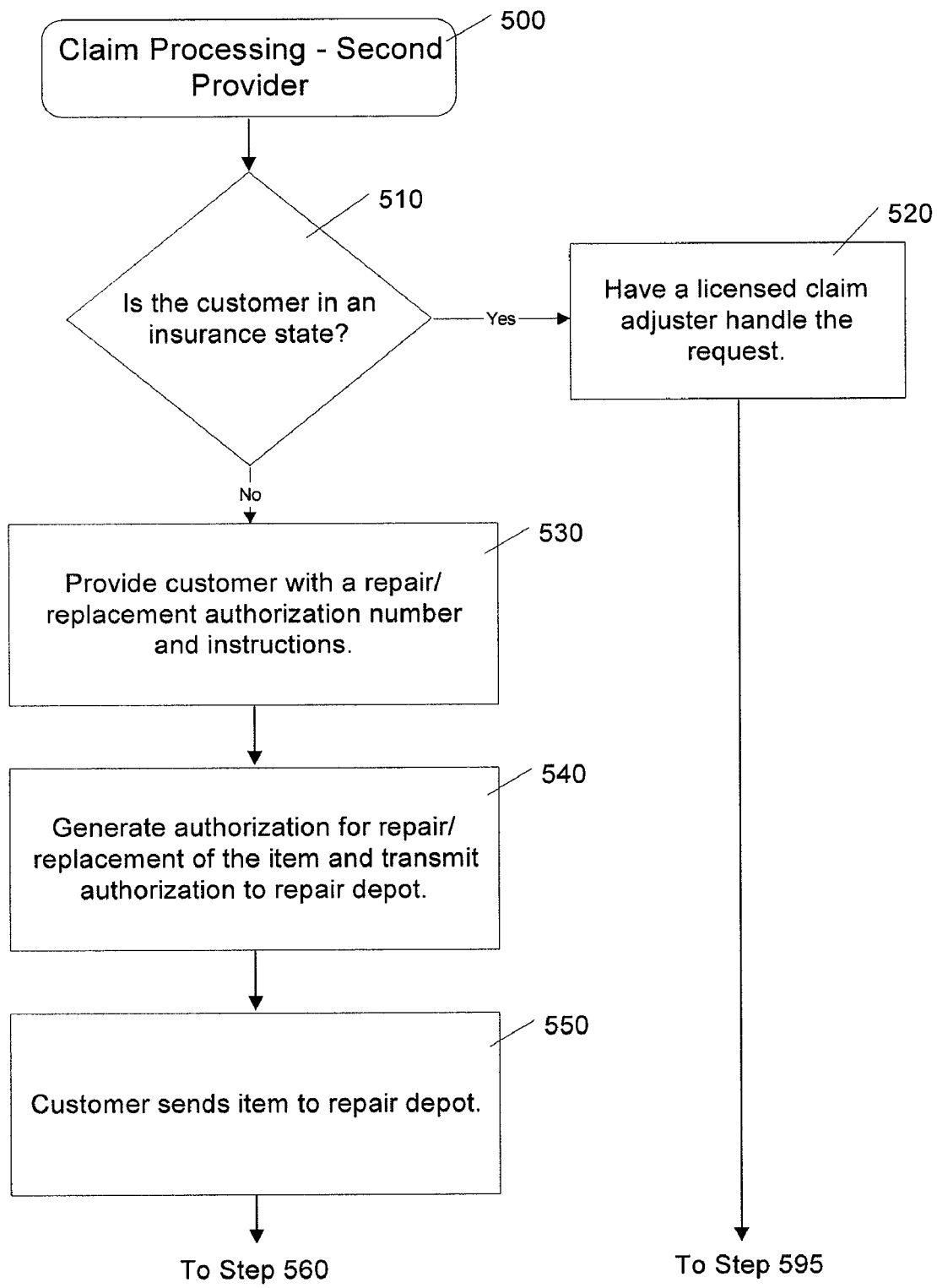
Figure 5B:
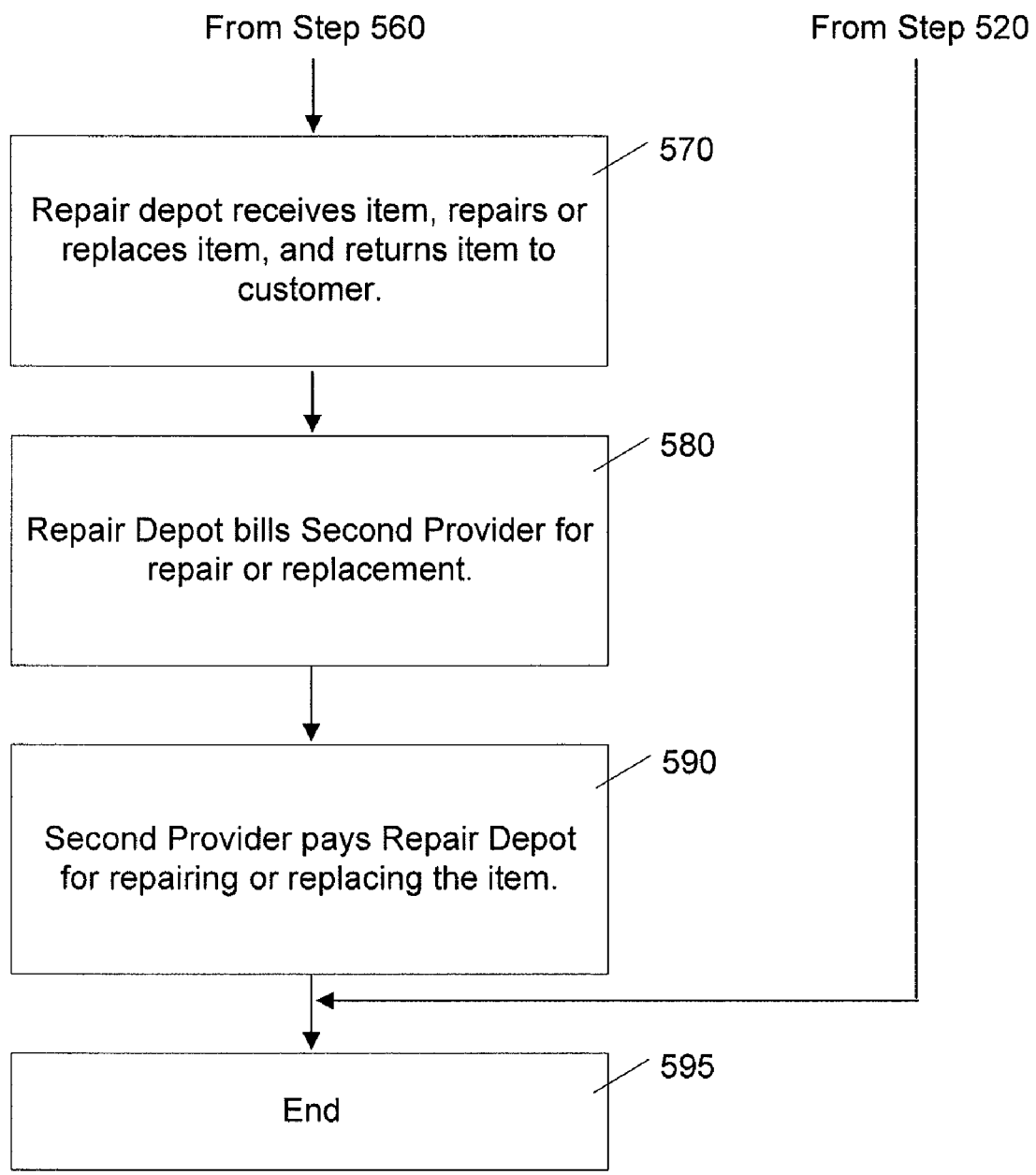

FIGS. 5A and 5B depict a flow chart of a second claim processing method according to another embodiment of the invention.

DETAILED DESCRIPTION OF VARIOUS EMBODIMENTS OF THE INVENTION

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

DEFINITIONS

As used in this disclosure, the term "property coverage" may be used, for example, to refer to an extended service contract (e.g., an extended warranty), or a property insurance policy.

Also, as used in this disclosure, the term "provider" refers to any entity providing a service contract (e.g., an extended service contract or an extended warranty) or a debt protection product (e.g., a debt deferment or debt cancellation contract). The term "provider" also refers to any entity providing (e.g., underwriting) an insurance policy, such as theft insurance, accidental death insurance or accidental damage insurance.

The term "repair or replace" includes the repair, replacement or substitution of the item or one or more component parts, as well as payment in the rare case where repair, replacement or substitution is not possible.

Nature of the Property Coverage

A product protection program according to one embodiment of the invention comprises first property coverage and second property coverage. In one embodiment of the invention, the first property coverage is a service contract that covers the failure (e.g., the mechanical breakdown) of an item such as a wireless device. In one embodiment of the invention, this service contract includes a "no-lemon" provision, which specifies that, if an item fails for the same reasons a pre-determined number of times (e.g., two, three, or four times), the item will be replaced rather than repaired.

In a particular embodiment of the invention, the second property coverage covers accidental damage to the item (such as damage caused by accidentally dropping the item), and/or other loss of the item (e.g., loss of the item through theft, fire, storm, burglary, natural disasters, war, riot, or other peril).

In another embodiment of the invention, the first property coverage is a service contract that covers both the failure of the item and accidental damage to the item. In one embodiment of the invention, the second property coverage covers other accidental loss of the item, but not accidental damage to the item.

In a preferred embodiment of the invention, there is little or no overlap between the first property coverage and the second property coverage. However, in other embodiments of the invention, there may be overlap between the first property coverage and the second property coverage.

Payment for the Property Coverage

In an embodiment of the invention, the first property coverage and the second property coverage are paid for by different entities. For example, in a particular embodiment of the invention, a first customer (e.g., the owner of the covered item) is responsible for paying for the first property coverage and a second customer (e.g., a retailer of the covered item, a service provider, such as a wireless carrier providing wireless service for the insured item, or a manufacturer of the insured item) is responsible for paying for the second property coverage. As will be understood by one skilled in the relevant field, the first and second property coverage may be set up to be paid monthly, annually, or according to any other convenient schedule. In one embodiment of the invention, the first and/or second customer may be billed regularly for the first and/or the second property coverage (e.g., as part of a regular bill for wireless service).

Providers of the Property Coverage

In an embodiment of the invention, different providers provide the first and second property coverage. For example, in one embodiment, the first property coverage is provided by a first entity and the second property coverage is provided by a second entity.

Offer of the Property Coverage to a Customer

In one embodiment of the invention, the first property coverage is offered for sale to a customer when the customer purchases a particular item that would be covered by the first property coverage. For example, in a particular embodiment of the invention, this occurs at the point of sale of the item (e.g., a traditional retail store such as Circuit City, or an Internet-based store such as Amazon.com).

In one embodiment of the invention, the second property coverage is at least initially provided (e.g., automatically) at no cost to the customer in response to the customer purchasing the first property coverage. For example, when a customer purchases a cellular phone at Sears, a Sears representative may offer to sell the customer a service contract (e.g., an extended warranty) that covers failures (such as mechanical failures and, where permitted, accidental damage) of the cellular phone beyond the cellular phone's normal warranty period. In response to the customer purchasing this service contract, Sears may automatically pay for property coverage (e.g., insurance coverage) that covers the product against damage or other loss. In this example, the service contract may be considered first property coverage (which is paid for by the customer) and the insurance coverage may be considered second property coverage (which is paid for by the retailer, Sears).

In another embodiment of the invention, the first property coverage is offered to the customer for purchase within a pre-determined time period (e.g., 30, 60 or 90 days) after the customer purchases the item to be covered under the service contract. In one embodiment, the second property coverage is then automatically provided to the customer in response to the customer purchasing the first property coverage. For example, after the customer purchases a cellular phone from a retailer, such as Sears, the retailer (or its contractor) may contact the customer (e.g. via phone call, e-mail message, or paper mail) to inform the customer that the customer has the option of purchasing the first property coverage. If the customer purchases the coverage, the customer automatically receives the second property coverage paid for by Sears.

Relationship Between the First and Second Property Coverage

In any of the embodiments of the invention described in this disclosure, the first and the second property coverage (e.g., a service contract and a property insurance policy) may be provided within a product protection program. In any of the embodiments of the invention described in this disclosure, the first and the second property coverage may be provided within two or more separate contracts.

In one embodiment of the invention (preferably in which the first and second property coverage is provided within a property protection program), the first and second property coverage is set up so that if timely payment is received for the first property coverage, but not the second property coverage, the second property coverage will be interrupted, but the first property coverage will not be interrupted. However, in a particular embodiment of the invention, the first and the second property coverage are also set up so that if timely payment is received for the second property coverage, but not the first property coverage, both the first and the second property coverage will be interrupted. This aspect of the invention is particularly useful when the first property coverage is to be paid for by a first entity and the second property coverage is to be paid for by a second entity that is not the first entity.

In another embodiment of the invention, the second property coverage (insurance policy) is set up so that if timely payment is not received for the second property coverage, only the second property coverage (insurance coverage) will be interrupted. In a further embodiment of the invention, the second property coverage (insurance policy) is set up so that if payment is not received for the first property coverage (service contract), both the first and the second property coverage will be interrupted.

Method of Processing Insurance Claims

In one embodiment of the invention, a centralized claim processing center (which, for example, may be managed by a third party claim administrator) is provided for processing claims covered by a product protection program, such as those described above. In a particular embodiment of the invention, the claim processing center processes, or facilitates processing of, both claims filed according to the terms of first property coverage (e.g., a service contract that covers against the failure of a particular item and in some cases, accidental damage), and claims filed according to the terms of second property coverage (e.g., insurance coverage that provides protection against damage to, and/or loss of, the particular item). As noted above, in one embodiment, different providers provide the first and second property coverages. In addition, in one embodiment, the first and the second property coverage are paid for by different entities or paid for by the same entity that pays for the second property coverage. Furthermore, in one embodiment of the invention, the first and second property coverage are part of a product protection program that is referenced by a single identification indicia (such as a plan number).

The centralized claim processing center preferably handles the processing of all (or substantially all) claims filed according to the terms of the first property coverage and the second property coverage. For example, in one embodiment of the invention, if the item covered by the first and the second property coverage is not working for any reason (and/or has been lost), the owner of the item may simply call the centralized claim processing center and explain the condition of the item (and provide any other relevant information) to a customer service representative. The customer service representative (or other individual associated with the centralized claim processing center) then determines whether the first and/or the second property coverage would cover repair or replacement of the item. If the item is covered under the first or second property coverages, the customer service representative (or other individual associated with the centralized claim processing center) arranges for the item to be repaired or replaced at the expense of the proper provider.

For example, if the damage to the item is covered under the first property coverage, which is provided by a first provider, the customer service representative (or other individual associated with the centralized claim processing center) arranges for the item to be repaired or replaced at the expense of the first provider. Similarly, if the damage to the item is covered under the second property coverage, which is provided by a second provider, the customer service representative (or other individual associated with the centralized claim processing center) arranges for the item to be repaired or replaced at the expense of the second provider. In one embodiment of the invention, if the claim is covered under the first or second property coverage, the central claim processing center directs the claim in accordance with pre-determined guidelines as to which provider the claim is to be submitted.

In one embodiment of the invention, an advantage of this centralized processing of the item is that it makes it easier for customers to handle the administrative aspects of maintaining two different types of protection for a single item. If the item is lost, is accidentally damaged, or suffers a failure (e.g., a mechanical breakdown or other failure), in a particular embodiment of the invention, the user need only use a single set of contact information (e.g., a telephone number, a street address, or Internet address) to contact a customer service representative (and, in one embodiment of the invention, return the item as instructed) and the customer service representative (or other individual associated with the centralized claim processing center) will arrange for any appropriate repair or replacement of the item.

In an alternative embodiment of the invention, the customer is provided with two or more different sets of contact information (e.g., telephone numbers, street addresses, or Internet addresses) for filing claims according to the plan protection program. For example, the customer may be provided with a first set of contact information to use for filing a claim if the item is lost or is in need of replacement or repair due to accidental damage. Similarly, the customer may be provided with a second set of contact information to use for filing a claim if the item suffers a failure, such as a mechanical breakdown. In one embodiment of the invention, the first set of contact information is contact information for a first provider that provides first property coverage that protects against a failure (e.g., a mechanical failure) of the item. Similarly, in one embodiment of the invention, the second set of contact information is contact information for a second provider that provides second property coverage that protects against damage to, or other loss of, the item.

EXEMPLARY SYSTEM ACCORDING TO AN EMBODIMENT OF THE PRESENT INVENTION

FIG. 1 is a block diagram of an exemplary contract system 100 according to one embodiment of the invention. As may be understood from this figure, this system comprises various components that are connected to exchange information via one or more networks 110 (such as the Internet, a LAN, or any other suitable network). The system components include a Point of Sale (POS) terminal 105, which may be, for example, a computer terminal within a retail store or a customer computer that is connected to the Internet. The system may further include a wireless tower 135 for facilitating communication between one or more wireless devices such as a cellular phone and the various system components.

The system components may also include a Customer Service Representative (CSR) terminal 120, which may be located, for example, at a central claim processing facility or at the offices of a first or a second provider. This CSR terminal 120 is configured to facilitate customer service for one or more property protection plans according to the present invention, including enrollment, fulfillment, claims processing and repair/replacement requests. Accordingly, the CSR terminal 120 is preferably configured to add, retrieve and update information stored in a database 125, which is discussed in greater detail below.

The system further includes a repair depot terminal 130, which may be, for example, a computer terminal within a repair depot (such as a repair depot for wireless items). In one embodiment of the invention, this repair depot is an entity that replaces and/or damaged items on behalf of the first or second provider. This repair depot may be managed or owned, for example, by a retailer, a wireless provider, a manufacturer, or a third party. This repair depot terminal 130 is preferably configured for allowing repair depot representatives to receive customer and contract information (such as an authorization from an provider to repair or replace a particular item), and for transmitting repair-related data (and other information) from the repair depot to other system components.

The system further comprises a database 125 that is configured for storing information received from other system components, and for allowing the system's various components to access information stored within the database 125. For example, when a customer signs up for an extended service plan, the customer's personal information (their name, address, and contact information) may be entered into the POS Terminal 105 and transmitted to the database 125 via the Network 110 for storage. That customer information may later be accessed, as needed, by repair workers using the repair depot terminal 130, or by a customer service representative using the CSR terminal 120. As will be understood by one skilled in the relevant field, the database 125 may be either a single database or multiple databases (which are either at a central location or distributed throughout various remote locations). In one embodiment of the invention, the database 125 is maintained within a central computer, such as an IBM AS/400 Midrange Server.

The database 125 may be configured to include, for example, information related to: (1) the customer; (2) one or more items to be protected by the product protection program (e.g., the make, model, and serial number of each of these items); (3) products, services, and insurance protection purchased by or afforded to the customer; (4) claims filed by the customer; and (5) the repair history of items owned by the customer. It should be understood that many other types of useful information may also be stored within the database 125.

As will be understood by one skilled in the relevant field in light of this disclosure, a system for implementing products according to the present invention may be set up to perform a periodic reconciliation process in order to update the status of various customer accounts within the system's database. For example, during this reconciliation process, the system may initiate the transmission of data from various remote computers (and other data sources), such as the POS terminal, the repair depot terminal, and the CSR terminal to determine identify any recent payments, outstanding payments due, policy cancellations, new customers, and other useful information. The system can then update the system's database according to this information.

As will be understood to one skilled in the art in light of this disclosure, the system 100 shown in FIG. 1 is merely an exemplary embodiment of a system according to the present invention. System components may be added, omitted, modified, or combined in any way known in the art.

Exemplary Enrollment Process

An exemplary enrollment process 200 according to one embodiment of the invention is shown in FIG. 2. As may be understood from this figure, this process begins at Step 210, where a customer purchases from a retailer an item and an extended service contract (e.g., an extended warranty) from a retailer, preferably at the same time as the item. In one example, the customer pays for this extended service contract and the first provider provides the extended service contract. This extended service contract protects against item failures, such as a mechanical breakdown of the item (which, as will be understood by one skilled in the art, would also include an electrical breakdown of the item).

In this example, the retailer will provide, at no cost to the customer, property coverage that protects against damage to, or other loss of, the item. A second provider provides this property coverage.

In response to the customer purchasing the extended service contract at Step 210, at Step 220, the retailer forwards payment and the customer's enrollment file to the first provider. In one embodiment of the invention, the enrollment file specifies that the coverage under the contract is to begin on the date on which the item was purchased. However, the contract may be set up to begin at any other convenient time, such as when additional information is received from the customer, or after the manufacturer's or other warranty has expired.

At Step 230, the first provider then processes the customer's enrollment file, applies the payment for the extended service contract, and forwards the customer's enrollment data for the second property coverage to the second provider. Finally, at Step 240, the first provider mails the customer a fulfillment kit. This fulfillment kit may include, depending upon the coverage, for example, a welcome letter, the service contract or an insurance policy or certificate, which provide "terms and conditions" of the first or second property coverages. In one embodiment of the invention, the insurance policy or certificate (second property coverage) is drafted to convey to the customer that the first and the second property coverages are interdependent.

The fulfillment kit may also include a request that the customer provide additional information (e.g., via paper forms, the Internet, or telephone). The customer may be instructed to provide this information, for example, to a provider, a retailer, or a wireless provider, depending on the terms of the contract.

Once the first and second property coverage is in place for the item, the customer may file a claim if the item fails, is accidentally damaged, or accidentally lost or otherwise is the subject of a loss. FIGS. 3A and 3B depict an exemplary claim processing process 300 according to one embodiment of the invention. First, at Step 310, the customer initiates a request for repair or replacement of the item. The customer may do this, for example, by calling a toll-free number of a centralized claim processing center. Alternatively, the customer may send the item, along with a claim form, to either a centralized claim processing center, the first provider, the second provider, or any other suitable entity. As a further alternative, the customer may initiate a request for repair or replacement of the item via the Internet.

Next, at Step 320, a customer service representative (which may be, for example, an automated voice response system, or an employee or representative of the first provider or the second provider) verifies the customer's service contract and the customer's insurance policy information. Next, the customer service representative determines whether the item has suffered an event covered under the service contract (such as a mechanical breakdown, but, in some cases accidental damage) 330. This may be done either by asking the customer to provide this information, or, if the item has been submitted along with a request for repair or replacement, by performing diagnostic tests on the item.

If the item has had suffered an event covered under the service contract, the system proceeds to Step 340 where it initiates processing of the request by the first provider. This may be done, for example, by: (1) transmitting a request and any other necessary information to the first provider via a computer network; (2) by placing a telephone call to a first provider customer representative; or (3) by any other appropriate method known in the relevant field.

If the item has not suffered an event covered under the service contract, at Step 350, the customer service representative determines whether the item has suffered an event covered under the insurance policy (e.g., the item has been stolen or damaged). This may be done either by asking the customer to provide this information, or, if the item has been submitted along with a request for repair or replacement, by performing diagnostic tests on the item.

If the item has suffered a loss due to an event covered under the insurance policy, the system proceeds to Step 360 where it initiates processing of the request by the second provider. This may be done, for example, by: (1) transmitting a request and any other necessary information to the second provider via a computer network; (2) placing a telephone call to a second provider customer representative; or (3) by any other appropriate method known in the art.

If the item has not suffered any first or second property coverage losses, at Step 370, the customer is informed that the requested repair or replacement is not covered under the terms of the protection program. The process then terminates at Step 380.

In one embodiment of the invention, once the request for repair or replacement is forwarded to the first provider, the request is handled according to the claim processing method 400 depicted in FIGS. 4A and 4B. When implementing this process, at Step 410, the first provider first provides the customer with a repair/replacement authorization number and instructions on how to use this authorization number to have the item replaced or repaired. At 420, the first provider then generates an authorization for service of the item (e.g., repair or replacement) and transmits the authorization to the repair depot (e.g., via a computer network).

In one embodiment of the invention, at Step 430, the customer then sends the item to the repair depot along with the authorization number underwritten by the first provider. At Step 440, the repair depot then receives the item and the authorization number from the customer, repairs or replaces the item, and sends the repaired item or replacement item to the customer.

Next, at Step 450, the repair depot bills the first provider for the repair or replacement. At Step 460, the first provider then pays the repair depot for the repair. The process then terminates at Step 470.

In one embodiment of the invention, once a request for repair or replacement is forwarded to the second provider, the request is handled according to the claim processing process 500 depicted in FIGS. 5A and 5B. When implementing this process, at Step 510, it is first determined (either manually or automatically) whether the customer is in a state requiring the use of licensed claims adjusters. If so, the request is transferred, at Step 520, to a licensed claim adjuster for processing.

If the customer is not in a state requiring the use of a licensed claims adjuster, at Step 530, the second provider provides the customer with a repair/replacement authorization number and instructions on how to use this authorization number to have the item replaced or repaired. Next, at Step 540, the second provider generates an authorization for service of the item (e.g., repair or replacement) and transmits the authorization to the repair depot (e.g., via a computer network).

In one embodiment of the invention, at Step 550, the customer then sends the item to the repair depot along with the authorization number provided by the second provider. At Step 560, the repair depot then receives the item and the authorization number from the customer, repairs or replaces the item, and sends the repaired item or replacement item to the customer.

Next, at Step 570, the repair depot bills the second provider for the repair or replacement. At Step 580, the second provider then pays the repair depot for repairing or replacing the item. The process then terminates at Step 590.

While the claim processing methods described above with respect to FIGS. 4A, 4B, 5A, and 5B are described as being performed by an provider, as will be understood by one skilled in the relevant field, these methods could be performed by any other eligible entity.

CONCLUSION

Many modifications and other embodiments of the invention will come to mind to one skilled in the art to which this invention pertains having the benefit of the teachings presented in the foregoing descriptions and the associated drawings. For example, while the techniques are described above as pertaining to situations in which a customer is to be provided with one or two different property coverages (e.g., for a single item), the same or similar techniques may be used in situations in which the customer is to be provided with three or more property coverages (e.g., for multiple items). Similarly, although the techniques are described above in the context of providing coverage for various items (such as personal property items), similar techniques may be used in the context of other types of property coverage or other types of insurance-related coverage. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method of processing a request that an item be repaired or replaced, said method comprising:
   receiving said request at a central claim processing facility;
   determining whether said item requires replacement or repair due to:
      an event covered under a service contract provided by a first provider, or
      an event covered under an insurance policy provided by a second provider;
   in response to determining that said item requires replacement or repair due to an event covered under said service contract, submitting a request to said first provider to process said item according to said service contract; and in response to determining that said item requires replacement or repair due to an event covered under said insurance policy, submitting a request to said second provider to process said item according to said insurance policy, wherein:
    said determining whether said item requires replacement or repair due to an event covered under said service contract comprises:
        determining whether said item has incurred a mechanical breakdown; and
        in response to determining that said item has incurred a mechanical breakdown, determining that said item requires replacement or repair due to an event covered under said service contract;
    said determining whether said item requires replacement or repair due to an event covered under said insurance policy comprises:
        determining whether said item has been damaged; and
        in response to determining that said item has been damaged, determining that said item requires replacement or repair due to an event covered under said insurance policy.

2. The method of claim 1, further comprising the processing an insurance claim corresponding to said request that said item be repaired or replaced.

3. The method of claim 1, further comprising, after determining that said item requires replacement or repair due to an event covered under said insurance policy:
    determining whether a customer who is submitting said request is in a state that requires the use of licensed claims adjusters; and
    in response to determining that said customer is in a state that requires the use of licensed claims adjusters, transferring said request to a licensed claim adjuster for processing.

4. The method of claim 1, wherein an individual associated with said central claim processing facility executes said determining whether said item requires replacement or repair due to: an event covered under said service contract; or an event covered under said insurance policy.

5. The method of claim 1, wherein said submitting a request to said first provider is executed by an individual associated with said central claim processing facility.

6. The method of claim 1, wherein said submitting a request to said second provider is executed by an individual associated with said central claim processing facility.

7. The method of claim 1, wherein an individual associated with said central claim processing facility executes:
    determining whether said item requires replacement or repair due to:
        an event covered under said service contract, or an event covered under said insurance policy; and
        submitting a request to said first provider.

8. The method of claim 1, wherein an individual associated with said central claim processing facility executes:
    determining whether said item requires replacement or repair due to:
        an event covered under said service contract, or an event covered under said insurance policy; and
        submitting a request to said second provider.

9. The method of claim 1, further comprising determining whether the event is covered under the service contract provided by the first provider before determining whether the event is covered under an insurance policy provided by the second provider.

10. A system for processing a request that an item be repaired or replaced, said system comprising:
    a computer network; and
        a customer service representative computer that is configured to:
            receive said request via said network;
            determine whether said item requires replacement or repair due to:
                an event covered under a service contract provided by a first provider, or
                an event covered under an insurance policy provided by a second provider;
            in response to determining that said item requires replacement or repair due to an event covered under said service contract, submitting submit a request via said computer network to said first provider to process said item according to said service contract; and
            in response to determining that said item requires replacement or repair due to an event covered under said insurance policy, submit a request via said network to said second provider to process said item according to said insurance policy, wherein:
                said determining whether said item requires replacement or repair due to an event covered under said service contract comprises the customer service representative computer being further configured to:
                    determine whether said item has incurred a mechanical breakdown; and
                    in response to determining that said item has incurred a mechanical breakdown, determine that said item requires replacement or repair due to an event covered under said service contract; and
                said step of determining whether said item requires replacement or repair due to an event covered under said insurance policy comprises the customer service representative computer being further configured to:
                    determine whether said item has been damaged; and
                    in response to determining that said item has been damaged, determine that said item requires replacement or repair due to an event covered under said insurance policy.

11. The system of claim 10, wherein said customer service representative computer is located at a central claim processing facility.

12. The system of claim 10, wherein said customer service representative computer is further configured to determine whether the event is covered under the service contract provided by the first provider before determining whether the event is covered under an insurance policy provided by the second provider.

* * * * *

UNITED STATES PATENT AND TRADEMARK OFFICE
CERTIFICATE OF CORRECTION

PATENT NO.         : 8,175,899 B2                                         Page 1 of 1
APPLICATION NO.    : 12/269299
DATED              : May 8, 2012
INVENTOR(S)        : Becerra et al.

It is certified that error appears in the above-identified patent and that said Letters Patent is hereby corrected as shown below:

Title page, item (73) Assignee: Delete "Fortis, Inc.," and insert therefor --Assurant, Inc.,--.

Signed and Sealed this
Twelfth Day of June, 2012

David J. Kappos
*Director of the United States Patent and Trademark Office*

UNITED STATES PATENT AND TRADEMARK OFFICE
CERTIFICATE OF CORRECTION

PATENT NO.        : 8,175,899 B2                                      Page 1 of 1
APPLICATION NO.   : 12/269299
DATED             : May 8, 2012
INVENTOR(S)       : Becerra et al.

It is certified that error appears in the above-identified patent and that said Letters Patent is hereby corrected as shown below:

Column 12,
Line 20, after "contract," cancel "submitting";
Line 41, "said step of determining" should read --said determining--.

Signed and Sealed this
Twenty-second Day of January, 2013

David J. Kappos
*Director of the United States Patent and Trademark Office*